United States Patent [19]

Hayashi

[11] 4,085,840

[45] * Apr. 25, 1978

[54] BAKERY FLEXIBLE BELT CARRYING PLATE

[76] Inventor: Torahiko Hayashi, Post Ooffice Box 50, 2-3, Nazawa-machi Utsunomiya 320, Japan

[*] Notice: The portion of the term of this patent subsequent to Oct. 29, 1991, has been disclaimed.

[21] Appl. No.: 698,819

[22] Filed: Jun. 23, 1976

Related U.S. Application Data

[63] Continuation of Ser. No. 518,951, Oct. 29, 1974, abandoned, which is a continuation-in-part of Ser. No. 213,277, Dec. 29, 1971, Pat. No. 3,844,402.

[30] Foreign Application Priority Data

Jan. 14, 1971  Japan ................................ 46-461172

[51] Int. Cl.² ............................................. B65G 47/00
[52] U.S. Cl. .................................... 198/472; 198/648; 211/126
[58] Field of Search ............... 198/472, 648, 688, 844, 198/834, 835, 580, 592, 603, 365; 214/16.4 R, 300; 211/126

[56] References Cited

U.S. PATENT DOCUMENTS

| 1,410,466 | 3/1922 | Gantvoort | 214/16.4 R |
| 2,815,850 | 12/1957 | Davis | 198/688 |
| 3,115,236 | 12/1963 | Anetsberger | 198/603 |
| 3,231,068 | 1/1966 | Harrison et al. | 198/365 |
| 3,844,402 | 10/1974 | Hayashi | 198/603 |

*Primary Examiner*—Evon C. Blunk
*Assistant Examiner*—Joseph E. Valenza
*Attorney, Agent, or Firm*—Guy W. Shoup

[57] ABSTRACT

A carrying plate, for use in a bakery, transports formed and fermented dough products and is adapted to be transported by a conveyor means and automatically unloaded. The core plate has an acute-angled front end and the endless flexible belt is provided with laterally extending ridges. The plate is advanced on the conveyor means to an unloading station where automatically a roller swings into contact with the lower surface of the belt on the plate to rotate it and unload the dough products.

1 Claim, 11 Drawing Figures

BAKERY FLEXIBLE BELT CARRYING PLATE

This application is a continuation application based upon the earlier filed Application Ser. No. 518,951, filed Oct. 29, 1974, now abandoned having the title BAKERY FLEXIBLE BELT CARRYING PLATE, which was a continuation-in-part of Application Ser. No. 213,277, filed Dec. 29, 1971, now U.S. Pat. No. 3,844,402 having the title BAKERY FLEXIBLE BELT CARRYING PLATE.

The present invention relates to a carrying plate assembly for semi-manufactured dough products such as bread and doughnuts. The carrying plate assembly is for use in transferring semi-manufactured dough products to a subsequent processing stage such as a band oven or a fryer.

Divided, formed and fermented dough products in most cases used to stick to the surface of a carrying plate and it has been very difficult to take off dough products from the carrying plate. In order to overcome the above difficulty, a cloth is placed on the carrying plate to separate the dough products from the carrying plate and a little amount of flour or oil is applied to the cloth before dough products are placed on it. However, the use of the cloth still cannot eliminate the sticking of dough products to the cloth to a satisfactory degree due to a long exposure of dough products to heat in the preceding proofing process. Further, it is necessary to pull by hand the cloth from the carrying plate so as to separate dough products from the carrying plate and to take off the cloth. Thus, it requires considerable trouble to take off dough products from the cloth and to replace the cloth with a new one for receiving new dough products. The present invention is intended to resolve such difficulties.

The present invention provides a simple device for automatically transferring semi-manufactured dough products such as bread and doughnuts to a subsequent processing stage such as a fryer or a band oven, namely, a carrying plate assembly having a substantially rectangular, flat core plate and an endless flexible belt rotatable around the upper and lower surfaces and the front and rear ends of the core plate, the front end of said core plate being acute-angled and said belt being sufficiently thin so as to follow the surfaces adjacent to said front end.

Advantageously, said carrying plate assembly is provided with evenly distributed laterally extending ridges spaced apart at short intervals such that a dough product rides on a plurality of said ridges.

The carrying plate assembly of the present invention may be supported on a conveyor at the transfer position, where the dough products are transferred or discharged to a subsequent processing stage by the rotation of the belt around the core plate of the carrying plate assembly caused, for example, by the rotation of a roller engaging the belt as described below.

When the belt is rotated around the core plate for transferring the dough products to a subsequent processing stage, the belt is caused to rotate at the front end of the core plate sharply changing the direction of movement. This is possible since the belt is sufficiently thin so as to follow the surfaces adjacent to said front end. The turning of the belt around the front end of the core plate at a very small radius enables the belt to separate the sticking dough products therefrom at the point of discharge. In case the belt turned at a large radius, dough products would move to the opposite side of the core plate along with the rotation of the belt and it would be difficult to remove the dough products from the belt.

When evenly distributed laterally extending ridges are formed on the outer surface of the belt, such ridges are effective in removing a sticky dough product from the carrying plate at the discharge station, because the contact between the dough product and the belt is limited by the ridges and at the front end of the carrying plate the outermost ends of any two adjacent ridges tend to spread, resulting in efficient removal of the dough product.

In some cases, such as when the dough product is highly sticky, it is desirable to minimize the contact between the belt and the dough product so that the dough product may be easily removed from the belt. To satisfy the above need, the ridge may be triangular in cross-section, the base of the triangle being parallel to the undersurface of the belt. The ridge may also constitute a series of equally sized pyramids adjacent to each other.

Another feature of the present invention is that the belt surrounds the core plate of the carrying plate assembly and along with the rotation of the belt around the core plate and the discharge of dough products, spots on the belt are gradually and successively vacated for the receipt of new dough products. The present invention, therefore, can avoid conventional processes such as replacing the cloth for carrying dough products with a new cloth each time discharge is completed. It is also possible, according to the present invention, to clean and apply release agents to the belt at places underneath the core plate assembly.

An object of the present invention is to provide a carrying plate assembly which enables easy and satisfactory automatic removal and transfer to a subsequent zone of semiprocessed dough products.

The above, and other objects, features and advantages of the invention will be apparent in the following detailed description of illustrative embodiments thereof which is to be read in connection with the accompanying drawing wherein.

Figure 1:
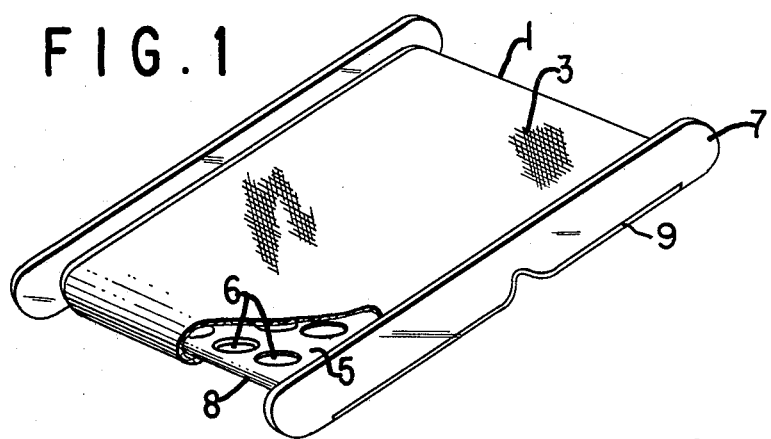
FIG. 1 is a partially broken away perspective view of the carrying plate assembly in an embodiment of the present invention.
Figure 11:
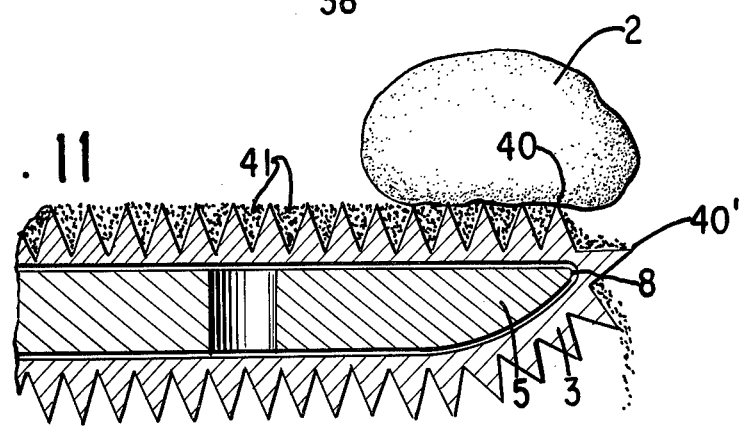
FIG. 11 is a cross-sectional view of a portion of an embodiment of the carrying plate assembly.

Referring to FIG. 1, the carrying plate assembly 1 comprises a core plate 5, which is a flat and substantially rectangular plate normally provided with many holes 6 for the circulation of air. The front end 8 and also preferably the rear end of the core plate 5 are acute-angled or thin so that the flexible belt turns around the end at a very small radius. The end may preferably be formed such that the upper surface of the core plate adjoining the end is flat and horizontal and the lower surface of the core plate adjoining the end recedes sharply therefrom, thus the end taking the form of a ship's bow in vertical cross-section, as illustrated in FIG. 11.

The core plate 5 may be formed symmetrically relative to the longitudinal and the lateral axes. Thus, the rear end may be formed like the front end 8. It is advantageous for the core plate to take the above form because then the carrying plate assembly may be placed upon the transfer position without paying attention to which of the front and the rear ends should be the leading end.

An endless flexible belt 3 covers tightly the upper and lower surfaces and the front and rear ends 8 of the core plate 5. The belt 3 may be made of a piece of thin cloth, but preferably a thin and flexible rubber or plastic film with evenly distributed crosswise ridges or indentations on the surface.

Figure 8:
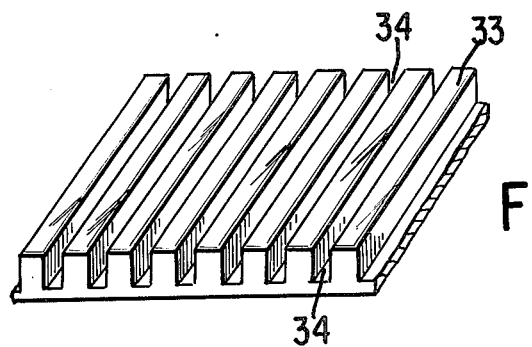
FIG. 8 is a cross-sectional view of a portion of an embodiment of the rotatable belt around the core plate of the carrying plate assembly.

As shown in FIG. 8, the ridges 33 may be rectangular in cross-section, spaced apart from each other by a recess 34. The belt is sufficiently thin at the recesses 34 to permit it to turn around the front end 8 of the core plate 5. Naturally, the belt, when provided with ridges, need not be so thin at the ridges. Contrarily, the ridges should have a certain thickness as described below. The distance between any adjacent ridges may preferably be as short as possible. In this structure, the widening of the distance at the front end 8 of the core plate is most effective for the separation of dough material from the ridges.

The adjacent ridges should be spaced apart at a distance such that at least two of the adjacent ridges may support a dough material thereon. It is desirable that the distance between the adjacent ridges is such that the bottom of the dough material does not touch the bottom surface of the recesses at any stage of the rotation of the belt.

Figure 9:
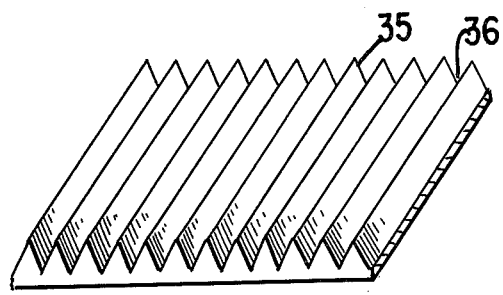
FIG. 9 is a similar view of another embodiment.

Referring to FIG. 9, the ridges 35 are triangular in cross-section. In this case, the recess 36 may be triangular in the reversed position.

Figure 10:
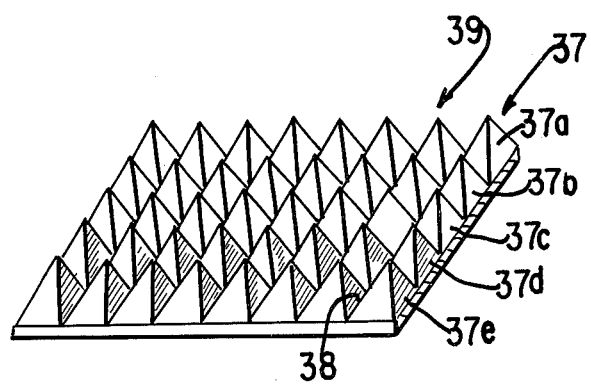
FIG. 10 is a similar view of a further embodiment.

Referring to FIG. 10, the ridges 37 are composed of a plurality of pyramids 37a, 37b, 37c, 37d and 37e arranged laterally, so as to form a recess 38 between any of the two adjacent ridges 37, 39.

The structures shown in FIGS. 9 and 10 are advantageous since flour powder may be evenly distributed in the recesses with ease. Further, the ridges in FIGS. 9 and 10 help the roller 11 to rotate the belt 3 because the shape of the indentations provides secure engagement between the belt 3 and the roller 11.

When the belt 3 is rotated around the core plate 5, since the front end 8 of the core plate is acute-angled, the distance between the outermost ends 40, 40' of any of the two adjacent ridges becomes greater, as illustrated in FIG. 11. The increase in the above distance results in separating the outermost end 40' of the leading ridge from the dough material 2 at the front end 8 of the carrying plate assembly. The continuous rotation of the belt 3 separates the dough material 2 from the belt 3 to the subsequent processing station. The removal of the dough material 2 is further assisted by flour powder 41 evenly distributed in the recesses of the belt 3. The above effect is particularly advantageously obtained in case the front end 8 of the core plate 5 is formed like a ship's bow as illustrated in FIG. 11, because the outermost end 40' of the leading ridge more readily separates from the surface of the dough material 2. The dough material 2 is supported on the top portions of the ridges in a horizontal position and only the leading ridge moves apart in such a manner that the outermost end 40' thereof makes a sharp turn downwardly around the front end 8 of the core plate 5, while increasing the distance between it and the outermost end 40 of the adjacent trailing ridge.

A pair of side boards 7 are attached to either side edge of the core plate 5 to prevent the belt 3 from slipping out of the plate.

Figure 2:
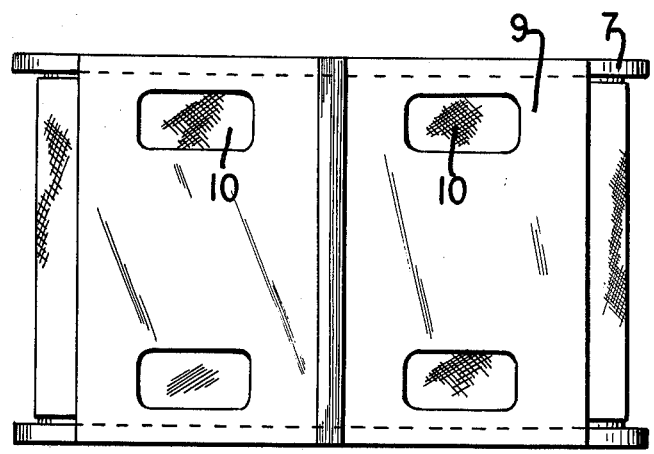
FIG. 2 is the bottom view of said carrying plate assembly.

Referring to FIG. 2, a bottom plate 9 is attached at its two sides to the lower surfaces of the side boards 7, spanning the core plate 5. The belt passes through the space between the bottom plate 9 and the core plate 5. The bottom plate is provided with a plurality of holes 10.

Figure 3:
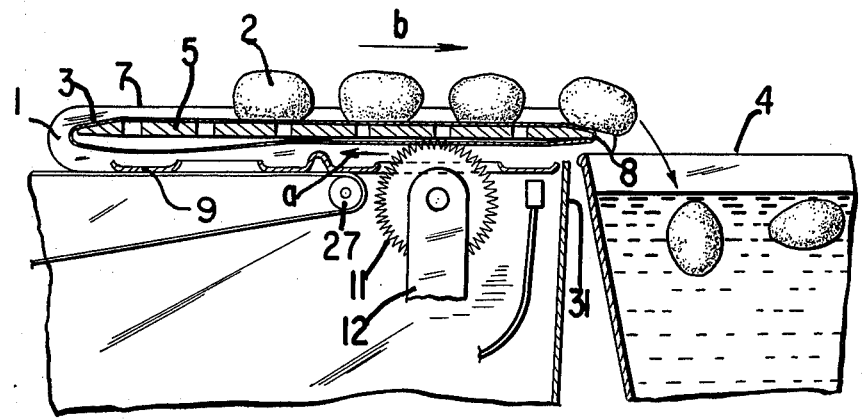
FIG. 3 is a schematic, cross-sectional view of an embodiment of the present invention particularly indicating the function of the roller and the belt at the transfer position.

Referring to FIGS. 3 through 7, the roller 11 has many projections around its periphery and is arranged to rotate counterclockwise in FIG. 3. The roller is adapted for reciprocal vertical movements and when it is raised it is inserted through a hole 10 and at its uppermost position the projections are made to engage the belt 3 on the lower surface of the core plate 5. By the rotation of the roller, the belt is made to rotate around the core plate in the direction of $a$ in FIG. 3. The bearing 12 of the roller 11 is supported by a shaft 13, which is adapted to make reciprocal, substantially vertical movements by means of a magnet 14. The magnet receives from the first approach switch 15 pulses which cause the magnet to move the shaft 13.

The carrying plate assembly 1 is mounted on a conveyor 29 before it approaches the transfer position. At the transfer position, the carrying plate assembly 1 is moved from the conveyor 29 to a conveyor 22, whose upper surface is substantially on the same level as the upper surface of the conveyor 29 and which is positioned adjacent to the conveyor 29 in the direction towards the transfer position.

The conveyor 22 comprises an endless belt rotatable around a roller 26 adjacent to the conveyor 29 and a roller 27 at the opposite end. A portion of the conveyor 22 is fixed to a joint 21, which in turn is connected to an arm 20. The arm 20 is arranged to move slidably in the geared motor 19 by the action of the latter.

Figure 4:
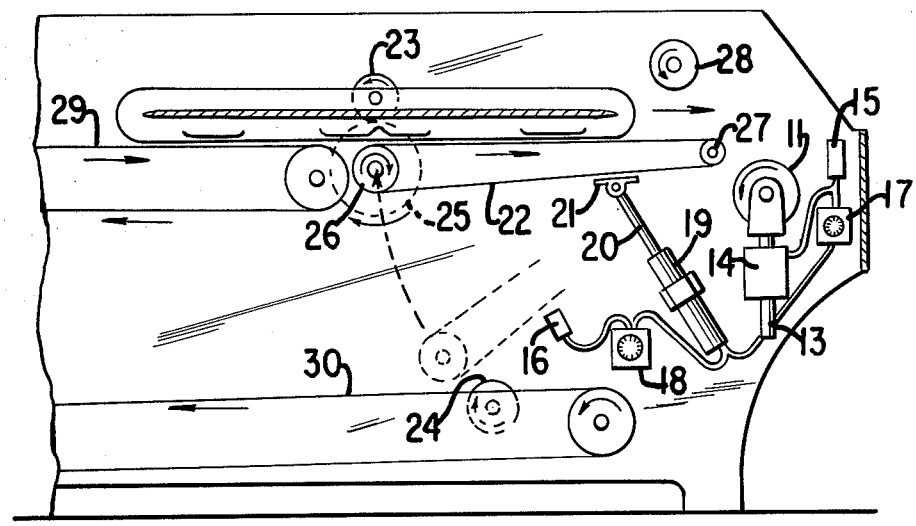
FIGS. 4 through 7 are schematic, cross-sectional views of an embodiment of the present invention illustrating different positions of a carrying plate assembly before, at and after the transfer position.
Figure 5:
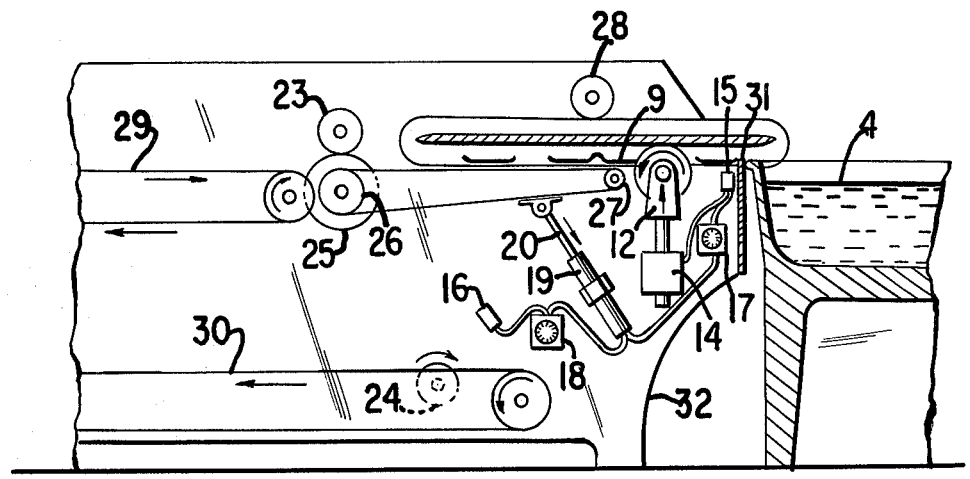
Figure 6:
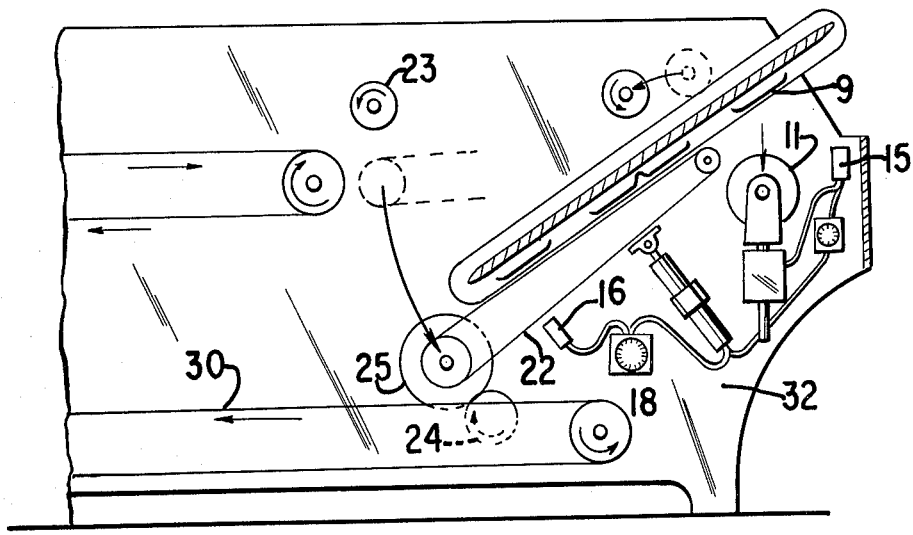
Figure 7:
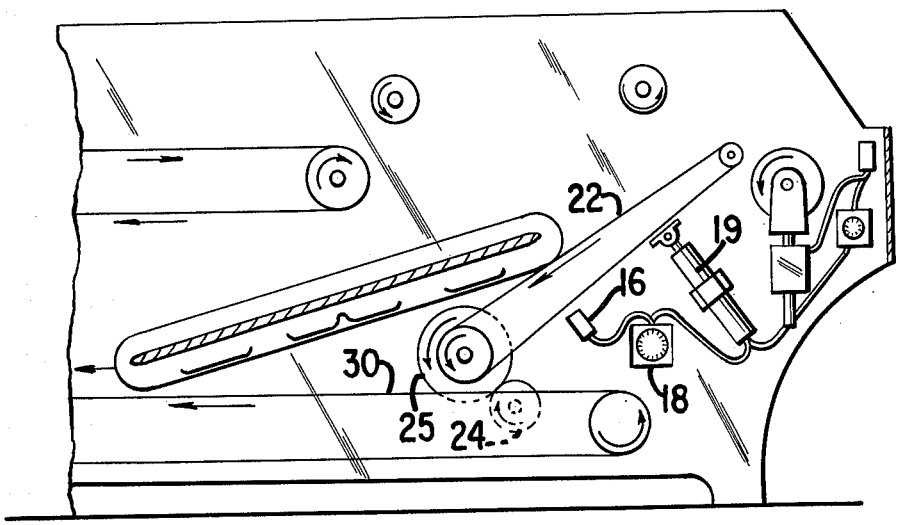

The conveyor 22 is adapted to swing around the roller 27 between a horizontal position as in FIGS. 4 and 5 and an inclined position as in FIGS. 6 and 7 by the motion of the arm 20. When the conveyor 22 is in the horizontal position, a gear 25 mounted on the shaft of the roller 26 meshes with a gear 23, which rotates counterclockwise in FIG. 4 and operates the conveyor 22 via the gear 25 and the roller 26. When the conveyor 22 is lowered to the inclined position, the gear 25 meshes with a gear 24, which imparts rotational movement to the belt of the conveyor 22 through the gear 25 and the roller 26. The direction of the rotation of the gear 24 is opposite that of the gear 23, thus causing the belt of the conveyor 22 to rotate in the opposite direction.

A roller 28 is fixed relative to the conveyor 22 at a position which is closer to the roller 27 and which permits the passage of the carrying plate assembly 1 between the roller 28 and the roller 27. The roller 28 guides the carrying plate assembly 1 when it passes on the conveyor 22. The roller 28 swings together with the conveyor 22 with the roller 27 as a fulcrum and rotates and stops synchronized with the movement of the conveyor 22.

The stop guide 31 at the foremost position of the device, at a portion of the housing 32, extends vertically so that its uppermost portion engages the front edge of the bottom plate 9 of the carrying plate assembly 1 when the carrying plate assembly 1 is brought to the foremost position as illustrated in FIGS. 3 and 5.

The first approach switch 15 is electrically connected to the gear 23, the magnet 14 and the first time switch 17. The time switch is further electrically connected to the geared motor 19. The first approach switch 15 senses the approach of the carrying plate assembly 1 and emits signals to the magnet 14, the first time switch 17 and the gear 23.

The second approach switch 16 is electrically connected to the second time switch 18, which in turn is electrically connected to the geared motor 19. The second approach switch 16 senses the approach of the carrying plate assembly 1 when the latter swings to the inclined position, and emits pulses to the second time switch 18.

The conveyor 30 is positioned underneath the conveyor 29 and the conveyor 22 on the level near that of the gear 24. It moves in the direction opposite to the movement of the conveyors 22 and 29, and it takes up the carrying plate assembly 1 after discharge of dough products.

The operation of the device of the present invention will be explained hereinafter following the movement of the carrying plate assembly 1. The carrying plate assembly 1 is forwarded by the conveyor 29 to the conveyor 22 as illustrated in FIG. 4. The forward movement of the carrying plate assembly 1 stops when the stop guide 31 engages the front edge of the bottom plate 9. At this stage, the carrying plate assembly comes within the sensing range of the approach switch 15, and thus the latter sends pulses to the gear 23 and the magnet 14. The rotation of the gear 23 stops by the signals from the approach switch 15 and consequently the movements of the conveyor 22 and the roller 28 are made to stop.

The roller 11 is elevated by the action of the magnet 14 taking signals from the approach switch 15, and going into a hole 10 in the bottom plate 9, engages the belt 3 at a portion underneath the core plate 5. The roller 11 then moves the belt 3 in the direction indicated by the arrow a. The belt 3 is made to move around the core plate 5 and the portion of the belt 3 on the top of the core plate 5 is then moved in the direction indicated by the arrow b. The dough products 2 carried on the belt are thus made to move along with the movement of the belt 3, and when each of the dough products 2 passes the front edge 8 of the core plate 5 it automatically drops into a fryer 4. As beforementioned, the dough products 2 usually stick to the belt 3 due to preceding heating in the proofing process. In the device of this invention, however, the edge 8 of the core plate 5 is acute-angled or substantially thin so that the belt 3 turns around the edge 8 at a very small radius and thus the belt 3 can be gradually and satisfactorily separated from the bottom portion of the dough product 12.

After a predetermined length of time fron the receipt of signals from the first approach switch 15, the first time switch 17 sends signals to the geared motor 19, so as to lower the arm 20 and to incline the conveyor 22 to the position indicated in FIG. 6. The above predetermined length of time is determined by the length of time sufficient for the discharge of all the dough products 2 on the carrying plate assembly 1 by the rotation of the belt 3. At this stage, the gear 25 disengages from the gear 23 and comes to mesh with the gear 24, which rotates the conveyor 22 in the opposite direction so as to send the carrying plate assembly 1 to the collecting conveyor 30 as illustrated in FIG. 7.

When the conveyor 22 is inclined as in FIG. 6, the bottom plate 9 of the carrying plate assembly 1 moves away from the first approach switch 15 and out of its sensing range. Consequently, the roller 11 returns to its retracted position as in FIG. 4 and the gear 23 starts rotation. Further, the inclined conveyor 22 enters the sensing range of the second approach switch 16 and thus the latter's pulses are sent to the timer 18. After a predetermined length of time, the geared motor 19 receives signals from the timer 18 to reverse the motion of the geared motor 19 and to extend the arm 20. The above predetermined length of time is determined by the time sufficient for the removal of the carrying plate assembly 1 from the conveyor 22. Thus, when the entire body of the carrying plate assembly 1 lands on the conveyor 30, the arm 20 returns the conveyor 22 to a horizontal position so as to receive the subsequent carrying plate assembly.

By the repetition of the above operations, dough products 2 brought forward to the transfer position on carrying plate assemblies 1 are successively and automatically separated from the carrying plate assemblies and fed to the subsequent processing stage.

The carrying plate assemblies which have completed discharge of dough products are automatically returned to the dough product receiving zone.

What is claimed is:

1. A carrying plate assembly for semimanufactured sticky dough products, such as bread and doughnuts, comprising a carrying plate assembly adapted to be movingly carried by moving conveyor means by placement on said moving conveyor means,;

said assembly having a substantially rectangular, flat core plate with the top and bottom surfaces of said flat core plate being substantially parallel to each other and an endless flexible belt with laterally extending ridges rotatable around the upper and lower surfaces at the front end of said core plate thereby forming a substantially pointed end at said front end;

said front end of said core plate being acute-angled and said flexible belt being sufficiently thin so as to contact the surfaces of said core plate adjacent to said front end of said core plate;

said front end of said core plate havng a substantially flat upper surface and a sharply receding lower surface;

said carrying plate assembly adapted to be placed on said moving conveyor means independent of any supporting means other than said moving conveyor;

said carrying plate assembly having a bottom plate engaging said moving conveyor means;

said flexible belt adapted to be turned by frictional contact with means engaging said belt directly when said carrying plate assembly approaches a transfer station, wherein said belt turns from the upper surface to the bottom of said core plate around the front end of said core plate and said belt turns from the bottom surface to the upper surface around the rear end of said core plate;

the configuration of said belt in its cross-section of laterally extending ridges being such that when said belt turns around the front end of said core plate the distance between the outward ends of any adjacent pair of ridges increases to such extent that the dough product thereon becomes separated from the ridges, thereby enabling separation of the dough product from said belt.

* * * * *